(12) United States Patent
Misono et al.

(10) Patent No.: US 7,796,215 B2
(45) Date of Patent: Sep. 14, 2010

(54) DOUBLE SIDED LIQUID CRYSTAL DISPLAY UNIT AND PORTABLE ELECTRONIC APPARATUS COMPRISING A POLARIZING ELEMENT BETWEEN TWO LIQUID CRYSTAL DISPLAY PANELS

(75) Inventors: Kenji Misono, Nara (JP); Mitsuhiro Murata, Yao (JP); Yukio Matsuura, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 247 days.

(21) Appl. No.: 12/089,089

(22) PCT Filed: Sep. 14, 2006

(86) PCT No.: PCT/JP2006/318245

§ 371 (c)(1),
(2), (4) Date: Apr. 3, 2008

(87) PCT Pub. No.: WO2007/040028

PCT Pub. Date: Apr. 12, 2007

(65) Prior Publication Data

US 2009/0040422 A1     Feb. 12, 2009

(30) Foreign Application Priority Data

Oct. 4, 2005    (JP) .............................. 2005-291217

(51) Int. Cl.
*G02F 1/1335*    (2006.01)
*G02F 1/1347*    (2006.01)

(52) U.S. Cl. .............................. 349/65; 349/56; 349/68; 349/74; 349/96

(58) Field of Classification Search ............. 349/61–71, 349/96–103
See application file for complete search history.

(56) References Cited

U.S. PATENT DOCUMENTS 6,700,637 B2    3/2004    Yano et al.

(Continued)

FOREIGN PATENT DOCUMENTS

GB    2 358 985 A    8/2001

(Continued)

OTHER PUBLICATIONS

Official communication issued in the International Application No. PCT/JP2006/318245, mailed on Nov. 28, 2006.

(Continued)

*Primary Examiner*—Andrew Schechter
*Assistant Examiner*—Michael Inadomi
(74) *Attorney, Agent, or Firm*—Keating & Bennett, LLP

(57) ABSTRACT

A liquid crystal display device includes first and second liquid crystal display panels located back to back. The liquid crystal display device further includes a light source provided to a side of a rear substrate of the first liquid crystal display panel, a light source provided to a side of a rear substrate of the second liquid crystal display panel, and a polarizing element provided between the first and second liquid crystal display panels. The rear substrate of the first liquid crystal display panel includes a light guide layer for directing light, incident on the rear substrate from the light source and propagating inside the rear substrate, toward the second liquid crystal display panel. The rear substrate of the second liquid crystal display panel includes a light guide layer for directing light toward the first liquid crystal display panel.

10 Claims, 13 Drawing Sheets

U.S. PATENT DOCUMENTS

| | | | |
|---|---|---|---|
| 6,796,659 | B2 | 9/2004 | Schaareman et al. |
| 6,882,380 | B2 * | 4/2005 | Yu et al. ...................... 349/61 |
| 2003/0063456 | A1 * | 4/2003 | Katahira ...................... 362/27 |
| 2003/0234897 | A1 | 12/2003 | Ozawa |
| 2006/0055850 | A1 | 3/2006 | Murata et al. |

FOREIGN PATENT DOCUMENTS

| | | |
|---|---|---|
| JP | 2002-189230 A | 7/2002 |
| JP | 2004-046050 A | 2/2004 |
| JP | 2004-093757 A | 3/2004 |
| JP | 2004-151560 A | 5/2004 |
| JP | 3108185 U | 4/2005 |
| JP | 2005-243259 A | 9/2005 |
| JP | 2005-266635 A | 9/2005 |
| JP | 2007-108265 A | 4/2007 |

OTHER PUBLICATIONS

"Kogaku Hakumaku (Optical Thin Film)," Published by Kyoritsu Shuppan Co., Ltd.; Feb. 1985; pp. 126-129.

"Oyobutsurikogaku Sensho 3 Hakumaku (Applied Physical Engineering, Selected Book 3, Thin Film)," Published by Baifukan Kabushiki Kaisha; Jun. 30, 1990; p. 203.

English translation of the official communication issued in counterpart International Application No. PCT/JP2006/318245, mailed on Sep. 18, 2008.

* cited by examiner

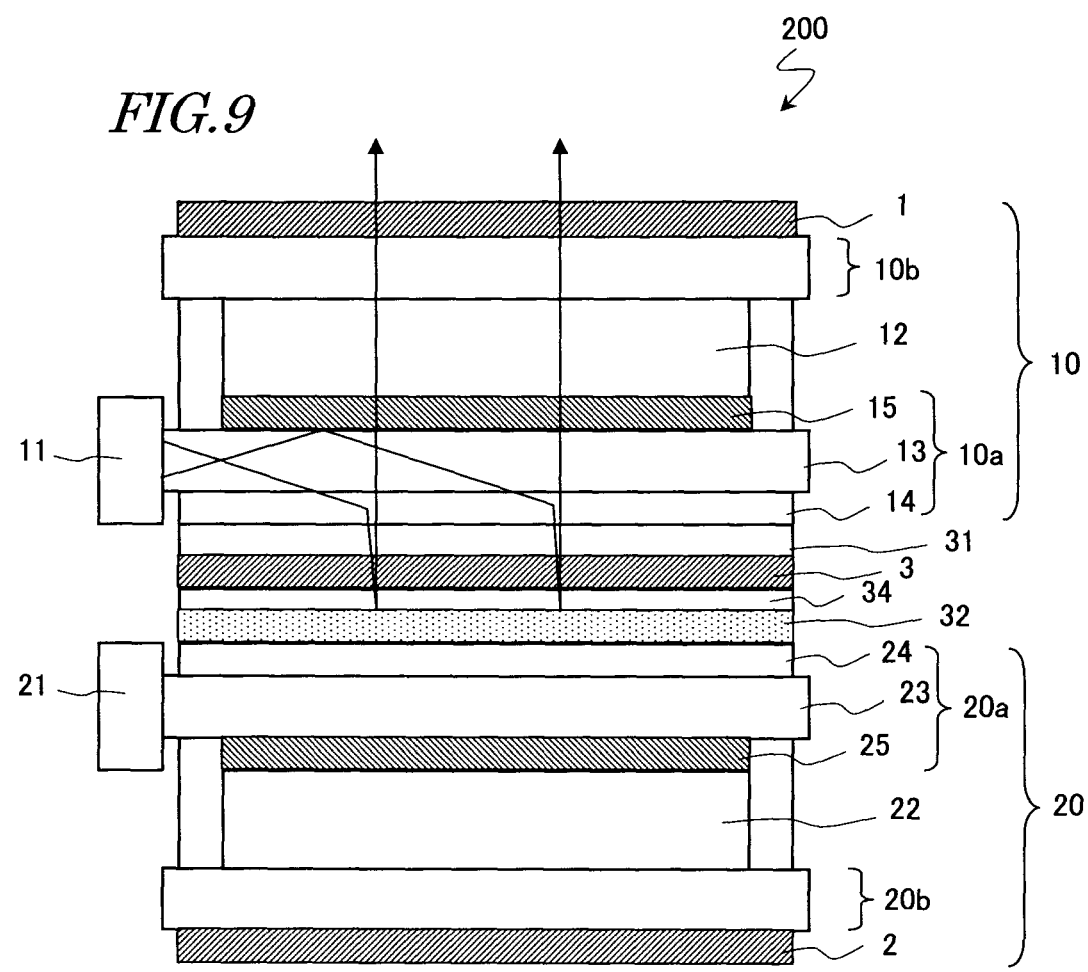

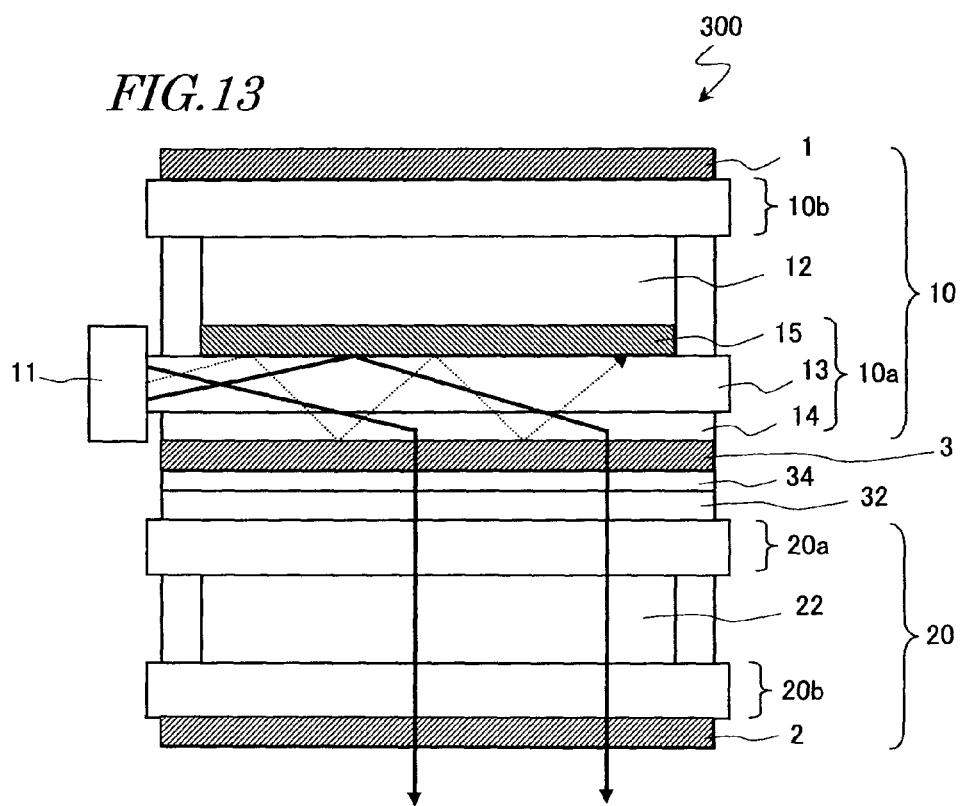
FIG. 13
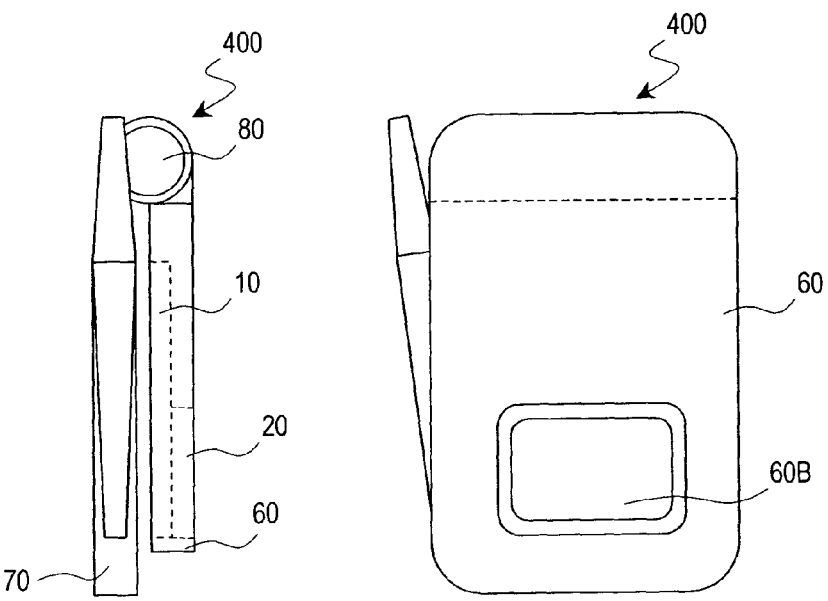
FIG. 14A
FIG. 14B

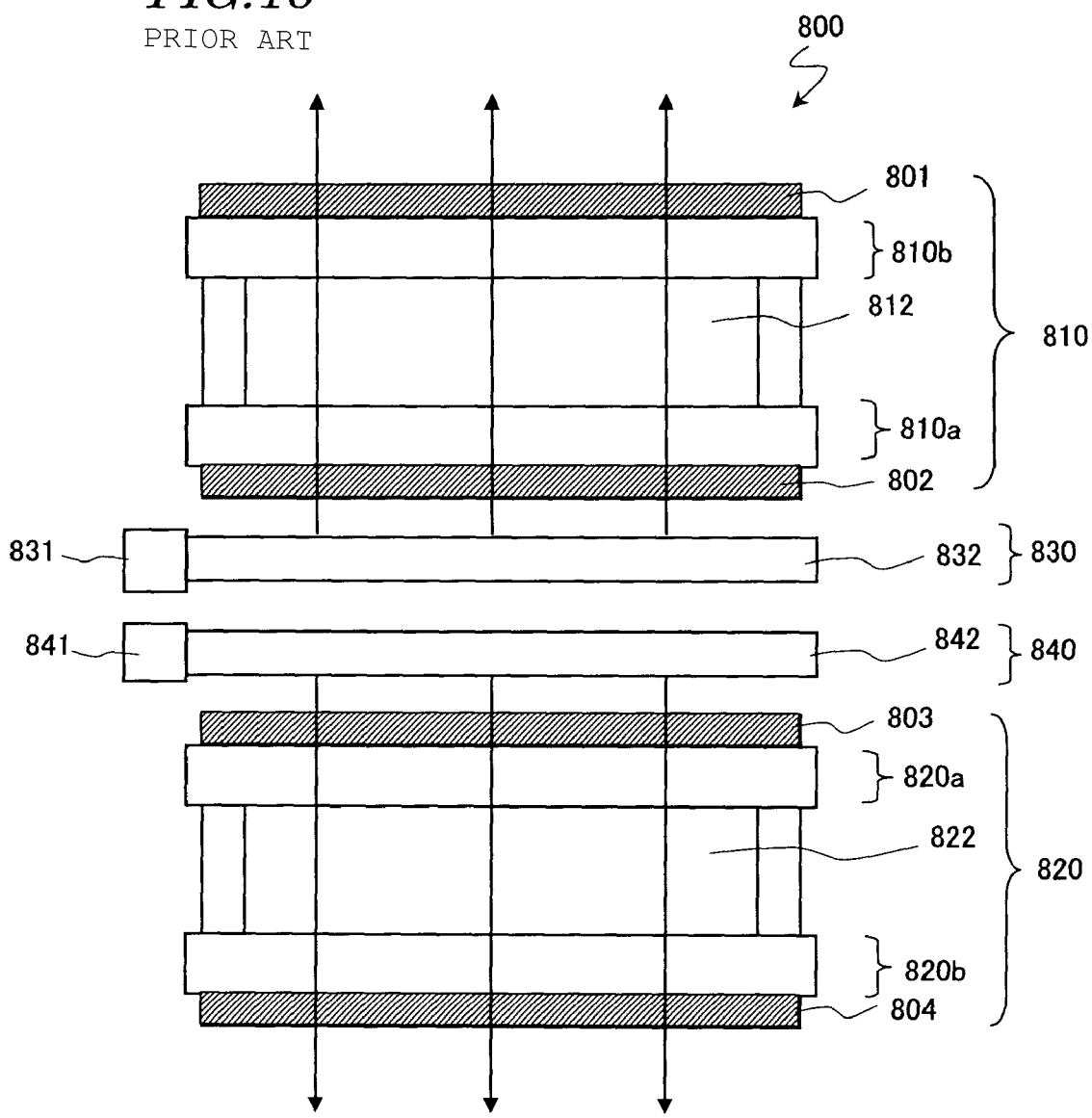

DOUBLE SIDED LIQUID CRYSTAL DISPLAY UNIT AND PORTABLE ELECTRONIC APPARATUS COMPRISING A POLARIZING ELEMENT BETWEEN TWO LIQUID CRYSTAL DISPLAY PANELS

BACKGROUND OF THE INVENTION

1. Field of the Invention

The present invention relates to a liquid crystal display device, and specifically to a liquid crystal display device including two liquid crystal display panels located back to back. The present invention also relates to a mobile electronic device including such a liquid crystal display device.

2. Description of the Related Art

Recently, mobile phones have been progressively spread, and foldable type phones are now mainstream. Especially, two screen type phones having a main display screen for displaying main information, and a sub display screen for displaying information in a supplementary manner where the phone is folded are popular owing to the convenience thereof. A two screen type mobile phone is described in, for example, Japanese Laid-Open Patent Publication No. 2001-136247.

FIG. 16 shows a liquid crystal display device usable for two screen type mobile phones. A liquid crystal display device 800 shown in FIG. 16 includes two liquid crystal display panels 810 and 820 located back to back. One of the liquid crystal display panels, 810, is used for a main screen (hereinafter, referred to as a "main panel"), and the other liquid crystal display panel 820 is used for a sub screen (hereinafter, referred to as a "sub panel").

The main panel 810 includes a pair of substrates 810a and 810b, and a liquid crystal layer 812 provided therebetween. A pair of polarizing plates 801 and 802 are respectively provided outside the substrates 810a and 810b. The sub panel 820 includes a pair of substrates 820a and 820b, and a liquid crystal layer 822 provided therebetween. A pair of polarizing plates 803 and 804 are respectively provided outside the substrates 820a and 820b.

The liquid crystal display device 800 also includes an illumination device 830 for emitting light toward the main panel 810 and an illumination device 840 for emitting light toward the sub panel 820. The illumination device 830 for the main panel 810 is an edge light type backlight including a light source 831 and a light guide plate 832 for guiding the light emitted from the light source 831 toward the main panel 810. The illumination device 840 for the sub panel 820 is also an edge light type backlight including a light source 841 and a light guide plate 842 for guiding the light emitted from the light source 841 toward the sub panel 820.

Today, mobile phones are desired to be thinner so that the user is not disturbed by the thickness thereof even in a folded state, and thus the liquid crystal display devices used for the mobile phones are also desired to be thinner.

However, the liquid crystal display device 800 shown in FIG. 16 includes two liquid crystal display panels 810 and 820 and also two illumination devices, and therefore is about twice as thick as usual liquid crystal display devices including one liquid crystal display panel.

SUMMARY OF THE INVENTION

In order to overcome the problems described above, preferred embodiments of the present invention reduce the thickness of a liquid crystal display device including two liquid crystal display panels located back to back.

A liquid crystal display device according to a preferred embodiment of the present invention includes a first liquid crystal display panel and a second liquid crystal display panel located back to back. The first liquid crystal display panel includes a first substrate, a second substrate located opposite from the second liquid crystal display panel with respect to the first substrate, a first liquid crystal layer provided between the first substrate and the second substrate, and a first polarizing element located opposite from the first substrate with respect to the first liquid crystal layer; and the second liquid crystal display panel includes a third substrate, a fourth substrate located opposite from the first liquid crystal display panel with respect to the third substrate, a second liquid crystal layer provided between the third substrate and the fourth substrate, and a second polarizing element located opposite from the third substrate with respect to the second liquid crystal layer. The liquid crystal display device further includes a first light source, provided to a side of the first substrate of the first liquid crystal display panel, for emitting light toward a side surface of the first substrate; a second light source, provided to a side of the third substrate of the second liquid crystal display panel, for emitting light toward a side surface of the third substrate; and a third polarizing element provided between the first liquid crystal display panel and the second liquid crystal display panel. The first substrate includes a first light guide layer for directing light, which is incident on the first substrate from the first light source and propagating inside the first substrate, toward the second liquid crystal display panel; and the third substrate includes a second light guide layer for directing light, which is incident on the third substrate from the second light source and propagating inside the third substrate, toward the first liquid crystal display panel. The above-described advantages are achieved by this structure.

In a preferred embodiment of the present invention, the first liquid crystal display panel performs display using light which has been output from the third substrate of the second liquid crystal display panel and passed through the third polarizing element; and the second liquid crystal display panel performs display using light which has been output from the first substrate of the first liquid crystal display panel and passed through the third polarizing element.

In a preferred embodiment of the present invention, the liquid crystal display device according to a preferred embodiment of the present invention further includes a first dimmer provided between the first substrate and the third polarizing element, the first dimmer being switchable between a light reflective state and a light transmissive state; and a second dimmer provided between the third substrate and the third polarizing element, the second dimmer being switchable between the light reflective state and the light transmissive state.

In a preferred embodiment of the present invention, the first liquid crystal display panel performs display using light which has been output from the first substrate, passed through the first dimmer in the light transmissive state and the third polarizing element, and then reflected by the second dimmer in the light reflective state; and the second liquid crystal display panel performs display using light which has been output from the third substrate, passed through the second dimmer in the light transmissive state and the third polarizing element, and then reflected by the first dimmer in the light reflective state.

In a preferred embodiment of the present invention, the first dimmer and the second dimmer are each an electrochromic element, the light reflectance of which is changed in accordance with a voltage application.

In a preferred embodiment of the present invention, the first substrate includes a first transparent plate for supporting the first light guide layer, and a first low refractive index layer provided between the first transparent plate and the first liquid crystal layer and having a lower refractive index than that of the first transparent plate; and the third substrate includes a second transparent plate for supporting the second light guide layer, and a second low refractive index layer provided between the second transparent plate and the second liquid crystal layer and having a lower refractive index than that of the second transparent plate.

In a preferred embodiment of the present invention, the first light guide layer includes a plurality of first reflective films for reflecting the light, propagating inside the first substrate, toward the second liquid crystal display panel; and the second light guide layer includes a plurality of second reflective films for reflecting the light, propagating inside the third substrate, toward the first liquid crystal display panel.

In a preferred embodiment of the present invention, the plurality of first reflective films and the plurality of second reflective films are a plurality of dielectric films.

Alternatively, a liquid crystal display device according to a preferred embodiment the present invention includes a first liquid crystal display panel and a second liquid crystal display panel located back to back. The first liquid crystal display panel includes a first substrate, a second substrate located opposite from the second liquid crystal display panel with respect to the first substrate, a first liquid crystal layer provided between the first substrate and the second substrate, and a first polarizing element located opposite from the first substrate with respect to the first liquid crystal layer; and the second liquid crystal display panel includes a third substrate, a fourth substrate located opposite from the first liquid crystal display panel with respect to the third substrate, a second liquid crystal layer provided between the third substrate and the fourth substrate, and a second polarizing element located opposite from the third substrate with respect to the second liquid crystal layer. The liquid crystal display device further includes a light source, provided to a side of the first substrate of the first liquid crystal display panel, for emitting light toward a side surface of the first substrate; a third polarizing element provided between the first liquid crystal display panel and the second liquid crystal display panel; and a dimmer provided between the third substrate and the third polarizing element, the dimmer being switchable between a light reflective state and a light transmissive state. The first substrate includes a light guide layer for directing light, which is incident on the first substrate from the first light source and propagating inside the first substrate, toward the second liquid crystal display panel. The above-described advantages are achieved by this structure.

In a preferred embodiment of the present invention, the first liquid crystal display panel performs display using light which has been output from the first substrate, passed through the third polarizing element, and then reflected by the dimmer in the light reflective state; and the second liquid crystal display panel performs display using light which has been output from the first substrate and passed through the third polarizing element and the dimmer in the light transmissive state.

In a preferred embodiment of the present invention, the dimmer is an electrochromic element, the light reflectance of which is changed in accordance with a voltage application.

In a preferred embodiment of the present invention, the first substrate includes a first transparent plate for supporting the first light guide layer, and a first low refractive index layer provided between the first transparent plate and the first liquid crystal layer and having a lower refractive index than that of the first transparent plate.

In a preferred embodiment of the present invention, the light guide layer includes a plurality of reflective films for reflecting the light, propagating inside the first substrate, toward the second liquid crystal display panel.

In a preferred embodiment of the present invention, the plurality of reflective films are a plurality of dielectric films.

A mobile electronic device according to another preferred embodiment of the present invention includes a liquid crystal display device having any of the above-described structures.

In a preferred embodiment of the present invention, the mobile electronic device according to the present invention is a foldable type mobile phone.

According to various preferred embodiments of the present invention, the thickness of a liquid crystal display device including two liquid crystal display panels located back to back is greatly reduced.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 9 schematically shows how the first liquid crystal display panel of the liquid crystal display device 200 performs display.

FIG. 13 schematically shows how the second liquid crystal display panel of the liquid crystal display device 300 performs display.

FIGS. 14A and 14B show a folded state of a mobile phone 400 including a liquid crystal display device according to a preferred embodiment of the present invention; wherein FIG. 14A is a side view and FIG. 14B is a front view.

FIGS. 15A, 15B and 15C show an opened state of the mobile phone 400; wherein FIG. 15A is a side view, FIG. 15B is a front view, and FIG. 15C is a rear view.

FIG. 16 is a cross-sectional view schematically showing a conventional liquid crystal display device 800 used for a two screen type mobile phone.

DETAILED DESCRIPTION OF THE PREFERRED EMBODIMENTS

Hereinafter, the present invention will be described by way of preferred embodiments with reference to the drawings. The present invention is not limited to the following preferred embodiments.

Preferred Embodiment 1

Figure 1:
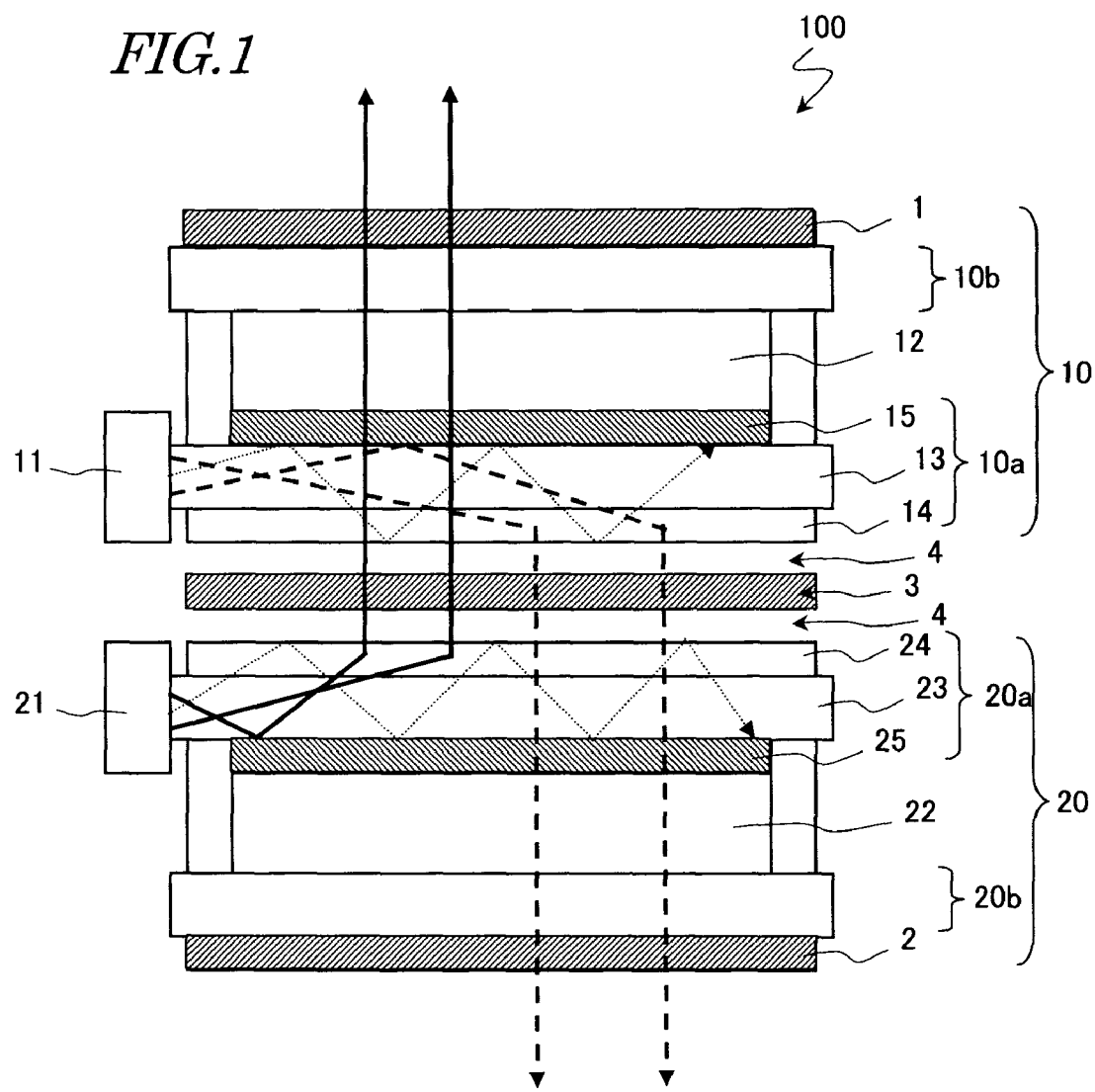
FIG. 1 is a cross-sectional view schematically showing a liquid crystal display device 100 according to a preferred embodiment of the present invention.

FIG. 1 shows a liquid crystal display device 100 according to this preferred embodiment. As shown in FIG. 1, the liquid crystal display device 100 includes a first liquid crystal display panel 10 and a second liquid crystal display panel 20 located back to back. Hereinafter, the first liquid crystal display panel 10 will be referred to simply as a "first panel", and the second liquid crystal display panel 20 will be referred to simply as a "second panel".

The first panel 10 includes a pair of substrates 10a and 10b, and a liquid crystal layer 12 provided therebetween. Among the pair of substrates 10a and 10b, the substrate 10a which is closer to the second panel 20 will be referred to as a "rear substrate", and the other substrate 10b which is located opposite from the second panel 20 with respect to the rear substrate 10a will be referred to as a "front substrate". One of the rear substrate 10a and the front substrate 10b is, for example, an active matrix substrate, and the other is, for example, a color filter substrate. Although not shown here, the active matrix substrate includes a switching element such as a TFT or the like and a pixel electrode, and the color filter substrate includes a color filter and a counter electrode. A polarizing plate (polarizing element) 1 is located at a position closer to an observer than the liquid crystal layer 12, i.e., opposite from the rear substrate 10a with respect to the liquid crystal layer 12.

The second panel 20 includes a pair of substrates 20a and 20b, and a liquid crystal layer 22 provided therebetween. Also regarding the second panel 20, among the pair of substrates 20a and 20b, the substrate 20a which is closer to the first panel 10 will be referred to as a "rear substrate", and the other substrate 20b which is located opposite from the first panel 10 with respect to the rear substrate 20a will be referred to as a "front substrate". One of the rear substrate 20a and the front substrate 20b is, for example, an active matrix substrate, and the other is, for example, a color filter substrate. A polarizing plate (polarizing element) 2 is located at a position closer to the observer than the liquid crystal layer 22, i.e., opposite from the rear substrate 20a with respect to the liquid crystal layer 22.

The liquid crystal display device 100 also includes a first light source 11 provided to a side of the rear substrate 10a of the first panel 10, a second light source 21 provided to a side of the rear substrate 20a of the second panel 20, and a polarizing plate (polarizing element) 3 provided between the first panel 10 and the second panel 20. The first light source 11 emits light toward a side surface of the rear substrate 10a of the first panel 10, and the second light source 21 emits light toward a side surface of the rear substrate 20a of the second panel 20. An air layer 4 is present between the polarizing plate 3 and the first panel 10, and between the polarizing plate 3 and the second panel 20.

Light emitted from the first light source 11 is incident on the rear substrate 10a of the first panel 10 and is propagating inside the rear substrate 10a while being totally reflected repeatedly. The rear substrate 10a of the first panel 10 includes a light guide layer 14 for directing the light propagating inside the rear substrate 10a toward the second panel 20. The rear substrate 10a also includes a transparent plate (e.g., a glass plate or a plastic plate) 13 for supporting the light guide layer 14, and a low refractive index layer 15 provided between the transparent plate 13 and the liquid crystal layer 12 and having a lower refractive index than that of the transparent plate 13. The low refractive index layer 15 is provided in order to totally reflect the light propagating inside the rear substrate 10a efficiently at the interface between the transparent plate 13 and the low refractive index layer 15.

Light emitted from the second light source 21 is incident on the rear substrate 20a of the second panel 20 and propagates inside the rear substrate 20a while being totally reflected repeatedly. The rear substrate 20a of the second panel 20 also includes a light guide layer 24 for directing the light propagating inside the rear substrate 20a toward the first panel 10. The rear substrate 20a also includes a transparent plate (e.g., a glass plate or a plastic plate) 23 for supporting the light guide layer 24, and a low refractive index layer 25 provided between the transparent plate 23 and the liquid crystal layer 22 and having a lower refractive index than that of the transparent plate 23.

Owing to the light guide layer 14 provided in the rear substrate 10a of the first panel 10, the light propagating inside the rear substrate 10a is output from the rear substrate 10a toward the second panel 20. The light output from the rear substrate 10a passes through the polarizing plate 3 provided between the first panel 10 and the second panel 20 and is incident on the second panel 20. The second panel 20 uses this light to perform display. Namely, the second panel 20 performs display using the light from the first light source 11 provided to the side of the rear substrate 10a of the first panel 10.

Owing to the light guide layer 24 provided in the rear substrate 20a of the first panel 20, the light propagating inside the rear substrate 20a is output from the rear substrate 20a toward the first panel 10. The light output from the rear substrate 20a passes through the polarizing plate 3 provided between the second panel 20 and the first panel 10 and is incident on the first panel 10. The first panel 10 uses this light to perform display. Namely, the first panel 10 performs display using the light from the second light source 21 provided to the side of the rear substrate 20a of the second panel 20.

As described above, the liquid crystal display device 100 in this preferred embodiment includes a light guide layer in the rear substrate of each of the two liquid crystal display panels, and allows light to be incident on the rear substrate from the light source provided to the side of the rear substrate. Thus, the rear substrate acts like a light guide plate. Therefore, as compared with the case where the backlight is used as shown in FIG. 16, the entire thickness of the liquid crystal display device can be reduced by the thickness of the light guide plate, which is provided in the case of FIG. 16 but not in this preferred embodiment.

In addition, the light guide layer of each liquid crystal display panel directs the light toward the other liquid crystal display panel. Therefore, the light output from the rear substrate of each liquid crystal display panel passes through the polarizing plate located between the two liquid crystal display panels and then is incident on the other liquid crystal display panel to be used for display. Namely, in this preferred embodiment, one polarizing plate is shared by the two liquid crystal display panels, which can further reduce the thickness of the liquid crystal display device.

As described above, according to preferred embodiments of the present invention, the thickness of the liquid crystal display device including two liquid crystal display panels located back to back can be reduced as compared to the conventional art.

Now, specific structures of the low refractive index layers 15 and 25 and the light guide layers 14 and 24 included in the rear substrates 10a and 20a will be described. In the following, the low refractive index layer 15 and the light guide layer 14 included in the rear substrate 10a of the first panel 10 will be described as an example, but the following description is also applied to the low refractive index layer 25 and the light guide layer 24 included in the rear substrate 20a of the second panel 20.

The low refractive index layer 15 may be formed of any material with no specific limitation as long as the material has a lower refractive index than that of the transparent plate 13. In order to propagate light efficiently inside the rear substrate 10a, however, the difference between the refractive index of the low refractive index layer 15 and the refractive index of the transparent plate 13 is preferably about 0.1 or greater, and more preferably about 0.18 or greater. The low refractive index layer 15 may be formed of, for example, $MgF_2$ (refractive index: about 1.38), a perfluoro resin (refractive index: about 1.34), or silicon oxide (refractive index: about 1.3).

Figure 2:
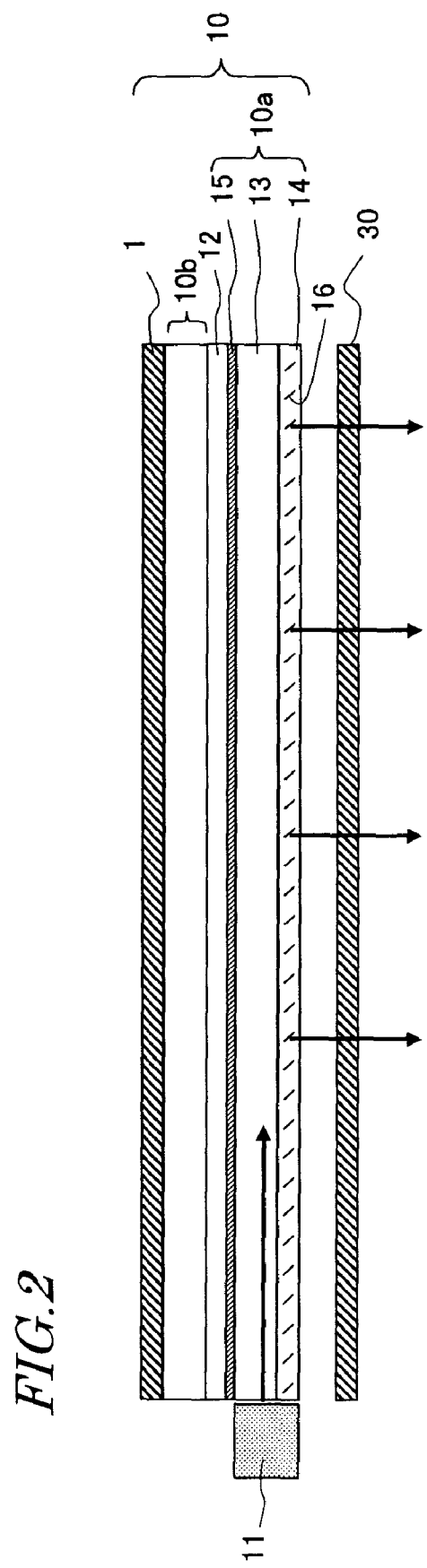
FIG. 2 is a cross-sectional view showing a portion of the liquid crystal display device 100.

As shown in FIG. 2, the light guide layer 14 in this preferred embodiment includes a plurality of reflective films 16 therein for reflecting the light propagating inside the rear substrate 10a toward the second panel 20. The reflective films 16 are inclined with respect to a main surface of the transparent plate 13; more specifically, are inclined such that an end thereof closer to the first light source 11 is closer to the transparent plate 13 than an end farther from the first light source 11. The inclination angle of the reflective films 16 (the inclination angle with respect to the main surface of the transparent plate 13) is preferably about 50° or greater and about 60° or less, and more preferably about 51° for empirical reasons.

The reflective films 16 may be metal films formed of aluminum, nickel, silver or the like, or may be dielectric films formed of $SiO_2$, $Al_2O_3$ or the like. Where dielectric films (which may be of a single layer or multiple layers) are used as the reflective films 16, the luminance of the liquid crystal display device can be increased because specific linear polarization can be selectively reflected and thus the amount of light absorbed by the polarizing plate 3 can be reduced.

Now, a preferable thickness of the reflective films 16 formed of dielectric films will be described. It is known that a polarizing beam splitter, which uses polarization dependence of the reflectance of a dielectric film and also uses light interference, can be designed such that the reflectance of S polarization is high while the reflectance of P polarization is kept low, by alternately stacking dielectric films having different refractive indexes with a thickness which fulfills the condition of $\lambda/4$ with respect to a specific optical wavelength $\lambda$ (for example, "Kogaku Hakumaku" (Optical Thin Film), pp. 126-129, published by Kyoritsu Shuppan Co., Ltd.). There are various known dielectric materials including $MgF_2$, $SiO_2$, $Al_2O_3$, $TiO_2$ and $ZrO_2$ (for example, "Oyobutsurikogaku Sensho 3, Hakumaku" (Applied Physical Engineering, selected book 3, Thin Film) page 203 published by Baifukan Kabushiki Kaisha). The reflective films 16 of the light guide layer 14 can also be designed to have a low reflectance of P polarization and a high reflectance of S polarization, by forming dielectric films with a thickness which fulfills the condition of $\lambda/4$.

The reflective films 16 may have any shape (the shape as seen in the direction of the normal to the liquid crystal layer 12). The reflective films 16 may be formed as lines (strips) as shown in FIG. 3A and FIG. 4A, or in islands (dots) as shown in FIG. 3B and FIG. 4B.

Figure 3A:
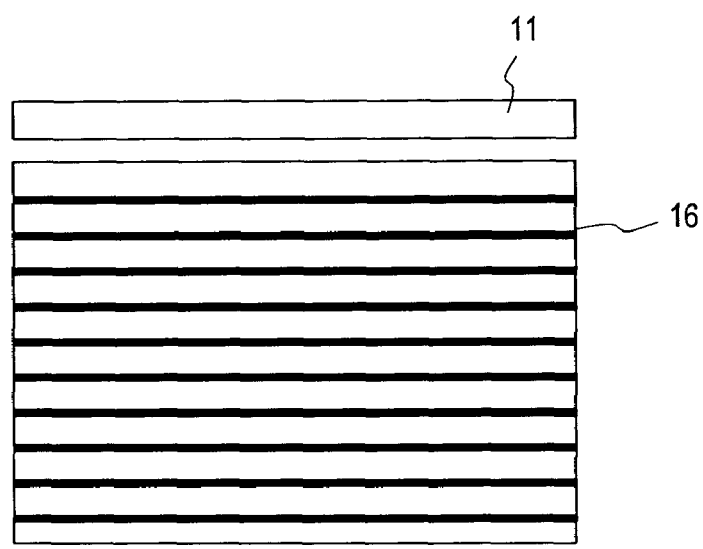
FIGS. 3A and 3B show exemplary shapes of reflective films of a light guide layer.
Figure 3B:
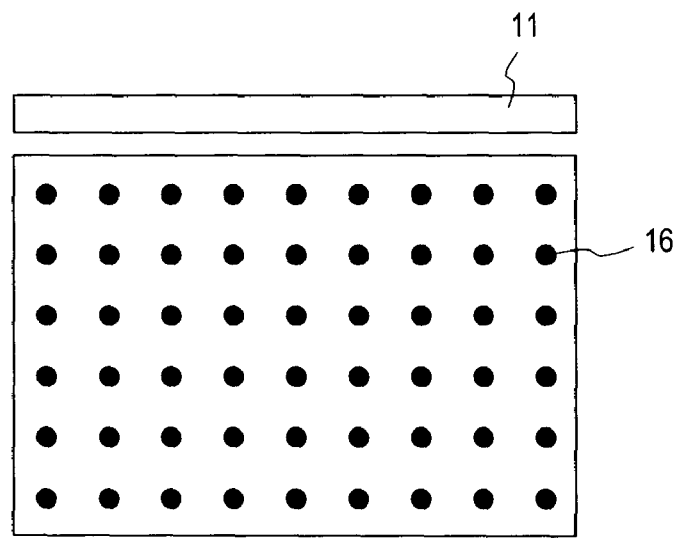
Figure 4A:
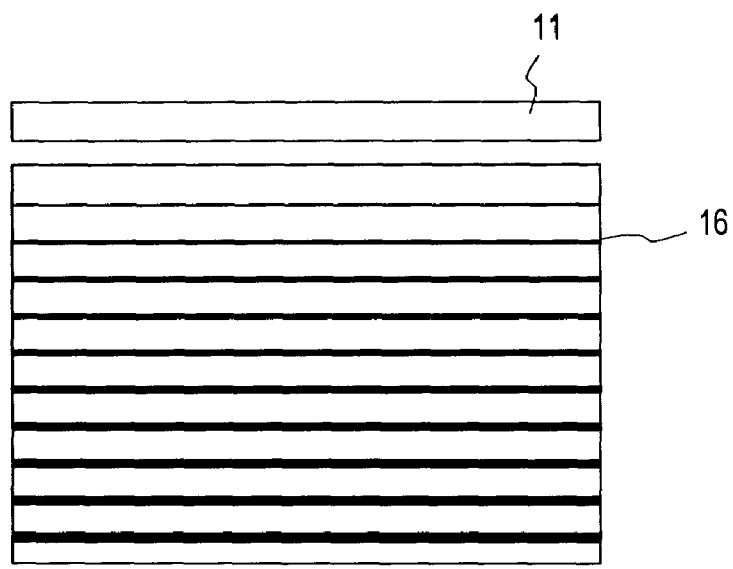
FIGS. 4A and 4B show other exemplary shapes of the reflective films of the light guide layer.
Figure 4B:
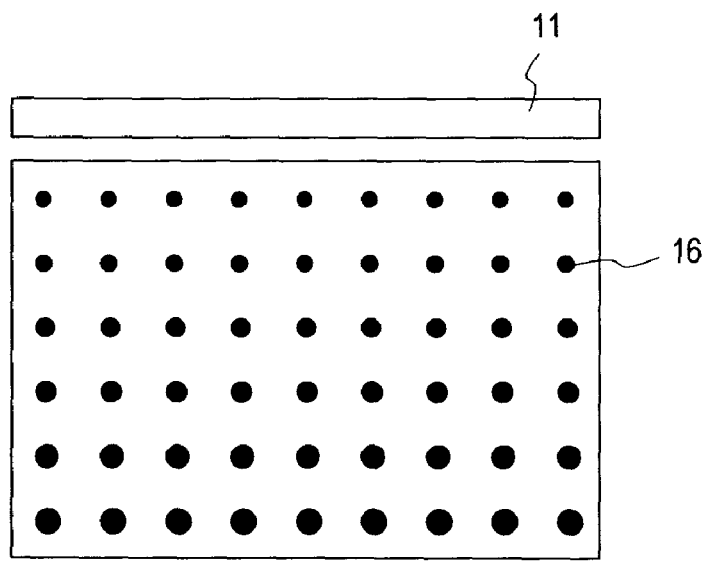

The reflective films 16 may be formed at a constant ratio as shown in FIGS. 3A and 3B, or may be formed so as to have a higher ratio as being farther from the first light source 11 as shown in FIGS. 4A and 4B. The amount of light propagating inside the rear substrate 10a decreases the farther it is from the first light source 11. Where the ratio of the reflective films 16 is increased the farther they are from the first light source 11, the intensity distribution of the light which is output from the rear substrate 10a can be uniform. As shown in FIGS. 4A and 4B, the reflective films 16 may be formed at a constant repeating pitch while the area size thereof is increased as it is located farther from the first light source 11. Alternatively, the reflective films 16 may be formed with substantially the same area size while the repeating pitch thereof is decreased the farther it is from the first light source 11.

Now, with reference to FIGS. 5A through 5D, one exemplary method for forming the light guide layer 14 will be described.

Figure 5A:
FIGS. 5A through 5D are cross-sectional views schematically showing steps of forming the light guide layer.

First, as shown in FIG. 5A, a plurality of projections 18 having a right-angled triangular cross-section are formed of a resin (e.g., an ultraviolet curable resin having a refractive index of 1.53) on a flat plate-like film 17 formed of a resin (e.g., ZEONOR produced by Zeon Corporation having a refractive index of 1.53).

Figure 5B:
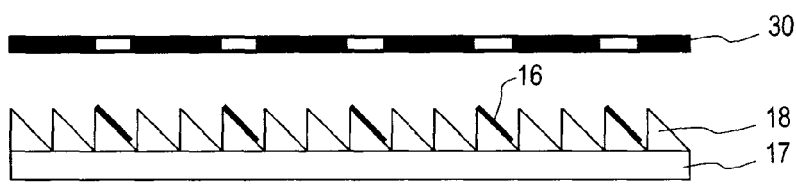

Next, as shown in FIG. 5B, on inclined surfaces of the projections 18 (the surfaces inclined with respect to a main surface of the film 17), a dielectric material (e.g., $TiO_2$ having a refractive index of 2.2 or $ZrO_2$ having a refractive index of 2.0) is vapor-deposited via a mask 30. Thus, the refractive films 16 are formed.

Figure 5C:
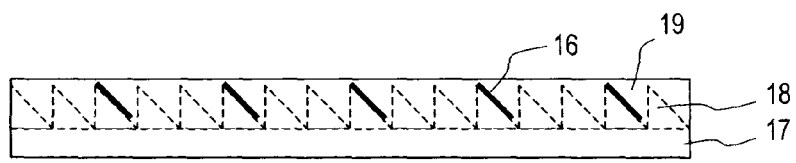

Next, as shown in FIG. 5C, an adhesive material (e.g., an ultraviolet curable resin or a sticky material each having a refractive index of 1.53) is applied so as to cover the projections 18. Thus, an adhesive layer 19 is formed.

Figure 5D:
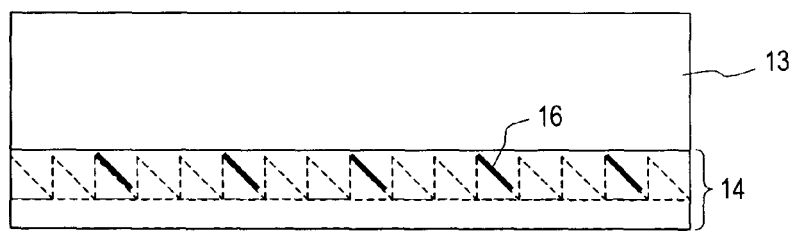

Then, as shown in FIG. 5D, the adhesive layer 19 is put into contact with a surface of the transparent plate (e.g., a glass plate having a refractive index of 1.52) 13 and is cured. Thus, the light guide layer 14 is formed on the transparent plate 13.

Now, with reference to FIGS. 6A through 6D, another exemplary method for forming the light guide layer 14 will be described.

Figure 6A:
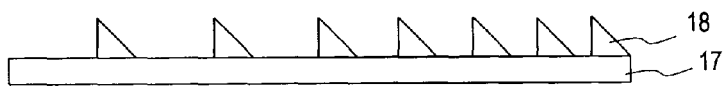
FIGS. 6A through 6D are cross-sectional views schematically showing steps of forming the light guide layer.

First, as shown in FIG. 6A, a plurality of projections 18 having a right-angled triangular cross-section are formed of a resin on a flat plate-like film 17 formed of a resin. In the step shown in FIG. 5A, the projections 18 are formed with no gap, whereas in the step shown in FIG. 6A, the projections 18 are formed with prescribed gaps. The projections 18 are formed such that the gaps are narrower as being farther from the first light source 11 provided later.

Figure 6B:
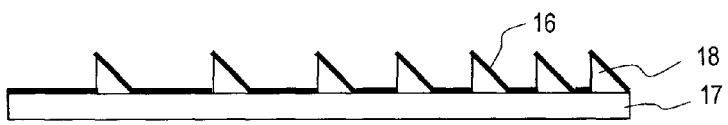

Next, as shown in FIG. 6B, a dielectric material is vapor-deposited on the film 17 having the projections 18 formed thereon. Thus, the refractive films 16 are formed. By this step, the refractive films 16 are formed on inclined surfaces of the projections 18 and on portions of the film 17 on which the projection 18 is not formed.

Figure 6C:
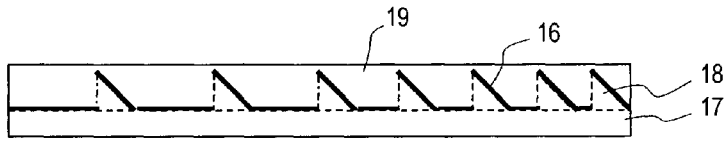

Next, as shown in FIG. 6C, an adhesive material is applied so as to cover the reflective films 16. Thus, an adhesive layer 19 is formed.

Figure 6D:
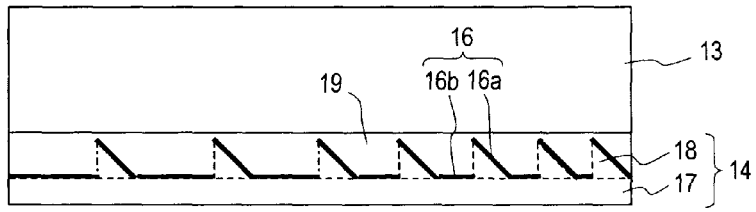

Then, as shown in FIG. 6D, the adhesive layer 19 is put into contact with a surface of the transparent plate 13 and is cured. Thus, the light guide layer 14 is formed on the transparent plate 13.

The reflective films 16 of the light guide layer 14 formed as shown in FIGS. 6A through 6D each have an inclined area 16a which is inclined with respect to the main surface of the transparent plate 13 and a parallel area 16b which is parallel to the main surface. The inclined area 16a contributes to outputting light and substantially acts as a reflective film.

The steps shown in FIGS. 5A through 5D require the locations of the reflective films 16 to be controlled by use of the mask 30. By contrast, the steps shown in FIGS. 6A through 6D can control the locations of the inclined areas 16a, substantially acting as the reflective films, merely by appropriately setting the locations of the projections 18. This simplifies the formation steps.

Preferred Embodiment 2

Figure 7:
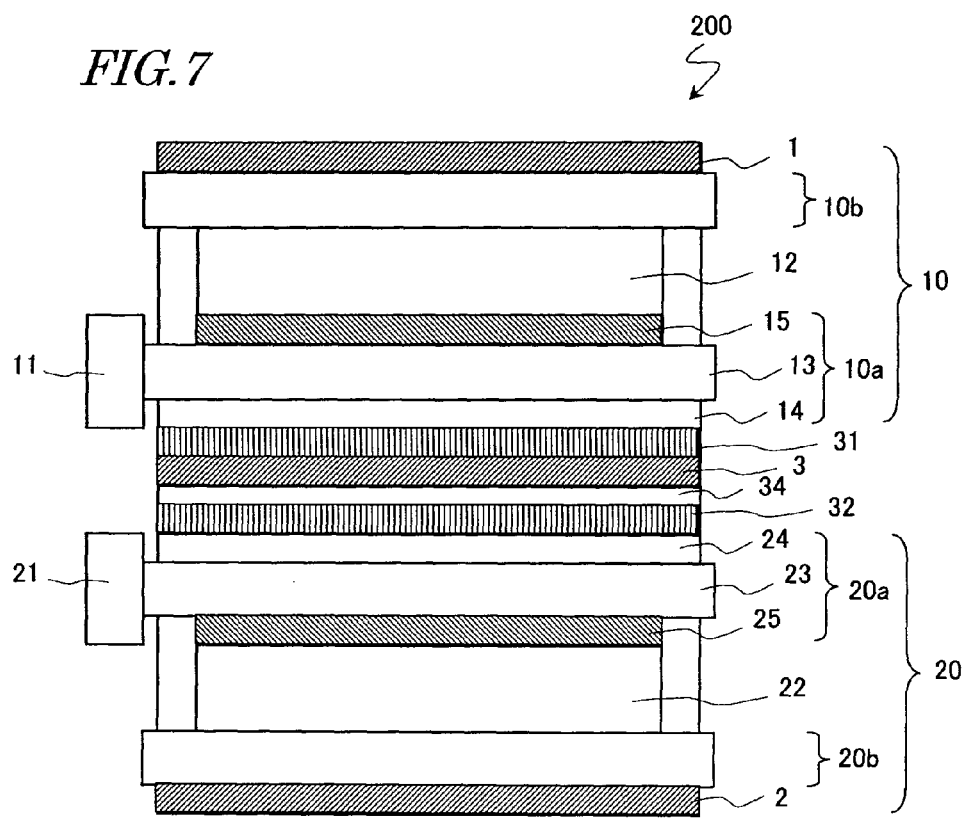
FIG. 7 is a cross-sectional view schematically showing another liquid crystal display device 200 according to a preferred embodiment of the present invention.

With reference to FIG. 7, a liquid crystal display device 200 according to this preferred embodiment will be described. In the following, differences of the liquid crystal display device 200 from the liquid crystal display device 100 in Preferred Embodiment 1 will be mainly described.

As shown in FIG. 7, unlike the liquid crystal display device 100 in Preferred Embodiment 1, the liquid crystal display device 200 includes a first dimmer 31 provided between the rear substrate 10a of the first panel 10 and the polarizing plate 3, and a second dimmer 32 provided between the rear substrate 20a of the second panel 20 and the polarizing plate 3.

Figure 8A:
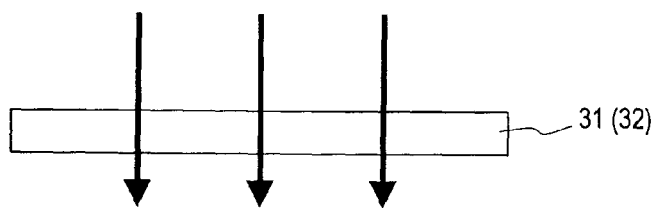
FIGS. 8A and 8B show functions of a dimmer.
Figure 8B:
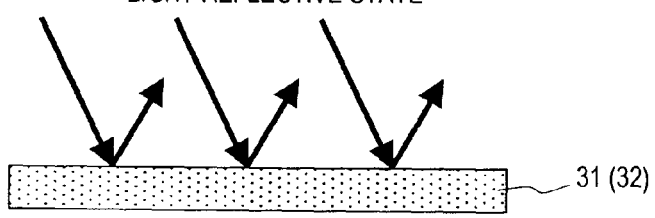

As schematically shown in FIGS. 8A and 8B, the first dimmer 31 and the second dimmer 32 can both be switched between a light reflective state and a light transmissive state. In this preferred embodiment, the first dimmer 31 is provided on the rear substrate 10a of the first panel 10, and the second dimmer 32 is provided on the rear substrate 20a of the second panel 20. The polarizing plate 3 is bonded to the first dimmer 31, and the second dimmer 32 and the polarizing plate 3 are bonded together with a gel-like transparent sticky material 34.

The liquid crystal display device 200 including the first dimmer 31 and the second dimmer 32 performs display as follows.

When the first panel 10 is to perform display, as shown in FIG. 9, the first dimmer 31 is in the light transmissive state and the second dimmer 32 is in the light reflective state. Namely, the first panel 10 performs display using light which has been output from the rear substrate 10a of the first panel 10, passed through the first dimmer 31 in the light transmissive state and the polarizing plate 3, and then reflected by the second dimmer 32 in the light reflective state.

Figure 10:
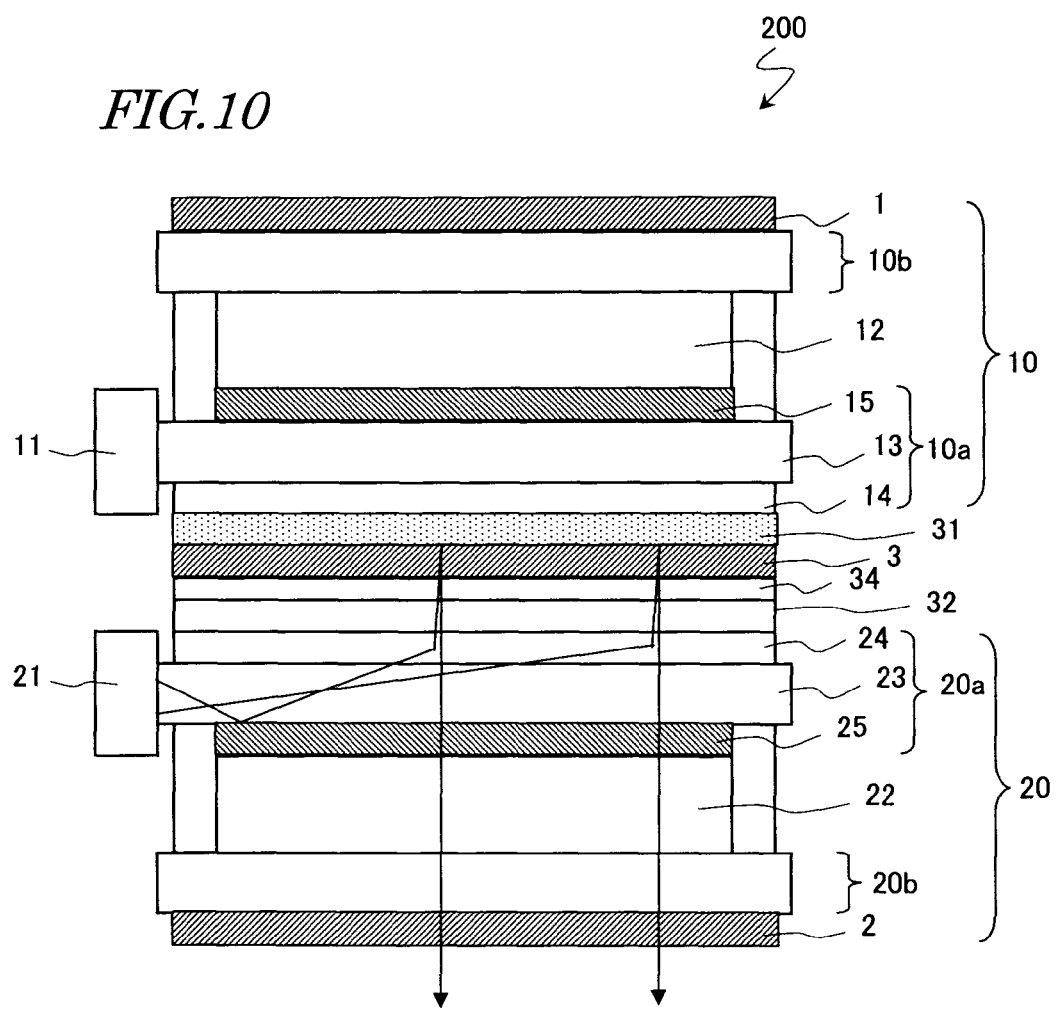
FIG. 10 schematically shows how the second liquid crystal display panel of the liquid crystal display device 200 performs display.

When the second panel 20 is to perform display, as shown in FIG. 10, the first dimmer 31 is in the light reflective state and the second dimmer 32 is in the light transmissive state. Namely, the second panel 20 performs display using light which has been output from the rear substrate 20a of the second panel 20, passed through the second dimmer 32 in the light transmissive state and the polarizing plate 3, and then reflected by the first dimmer 31 in the light reflective state.

In the liquid crystal display device 200 in this preferred embodiment also, the rear substrate of each of the two liquid crystal display panels acts as a light guide plate. Therefore, as compared with the case where the backlight is used as shown in FIG. 16, the entire thickness of the liquid crystal display device can be reduced by the thickness of the light guide plate, which is provided in the case of FIG. 16 but not in this embodiment. In addition, one polarizing plate 3 is shared by the two liquid crystal display panels, which can further reduce the thickness of the liquid crystal display device.

Furthermore, the first dimmer 31 and the second dimmer 32 are switched between the light transmissive state and the light reflective state in synchronization with the driving of the first panel 10 and the second panel 20. This allows the two panels to appear as being lit up at the same time.

Specifically usable for the first dimmer 31 and the second dimmer 32 are electrochromic elements, the light reflectance of which is reversibly changed by a voltage application. An electrochromic element includes a dimmer layer formed of a material, the light reflectance of which is reversibly changed by electrochemical oxidation and reduction reactions, and a pair of transparent conductive layers for applying a voltage to the dimmer layer. The dimmer layer is, for example, a rare earth metal thin film of yttrium, lanthanum or the like, or a magnesium-nickel alloy thin film covered with palladium or the like.

An electrochromic element in the light reflective state specular-reflects light. For this reason, in order to prevent external light from being imaged or in order to enlarge the viewing angle, it is preferable to provide a light scattering element. For example, polarizing plates with a light scattering layer may be preferably used as the polarizing plates 1 and 2. As the dimmers 31 and 32, elements other than the electrochromic element may be used. For example, a gaschromic element is usable. The light reflectance of a gaschromic element is reversibly changed in accordance with the concentration of a specific chemical element in the atmosphere. A usable material for the gaschromic element may be, for example, a magnesium-nickel alloy thin film.

Preferred Embodiment 3

Figure 11:
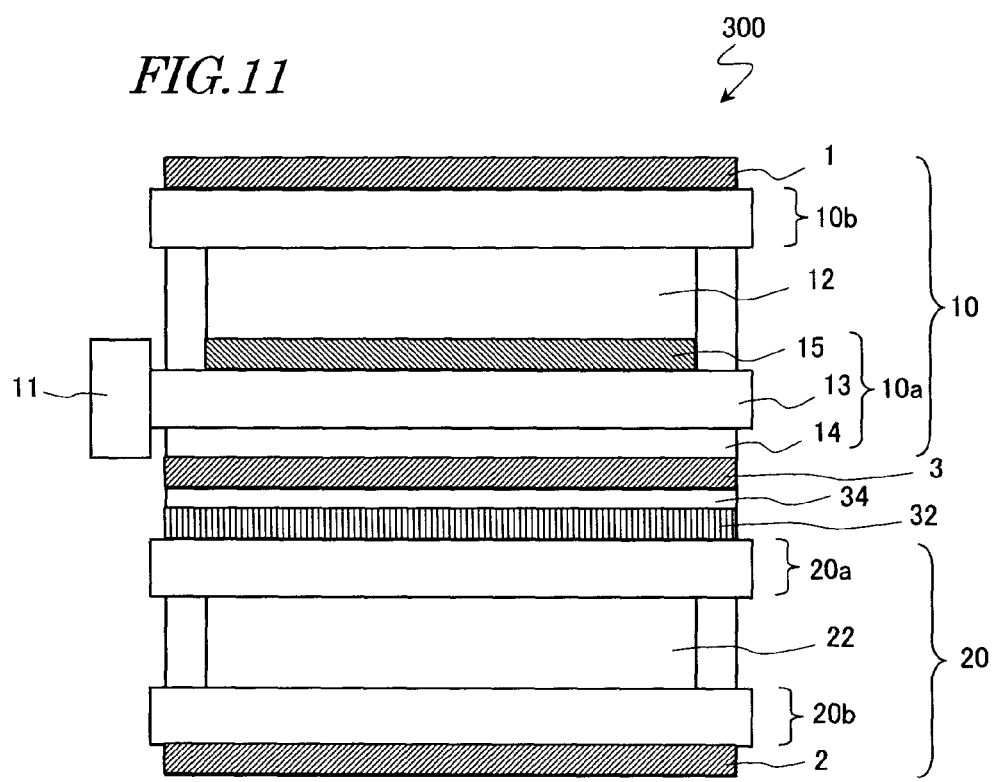
FIG. 11 is a cross-sectional view schematically showing still another liquid crystal display device 300 according to a preferable embodiment of the present invention.

With reference to FIG. 11, a liquid crystal display device 300 according to this preferred embodiment will be described. In the following, differences of the liquid crystal display device 300 from the liquid crystal display device 200 in Preferred Embodiment 2 will be mainly described.

In the liquid crystal display device 300, as shown in FIG. 11, the light source 11 is provided to a side of the rear substrate 10a of the first panel 10, but no light source is provided to a side of the rear substrate 20a of the second panel 20. The dimmer 32 is provided between the rear substrate 20a of the second panel 20 and the polarizing plate 3, but no dimmer is provided between the rear substrate 10a of the first panel 10 and the polarizing plate 3. The rear substrate 10a of the first panel 10 includes the light guide layer 14 and the low refractive index layer 15, but the rear substrate 20a of the second panel 20 includes neither the light guide layer nor the low refractive index layer.

The liquid crystal display device 300 in this preferred embodiment performs display as follows.

Figure 12:
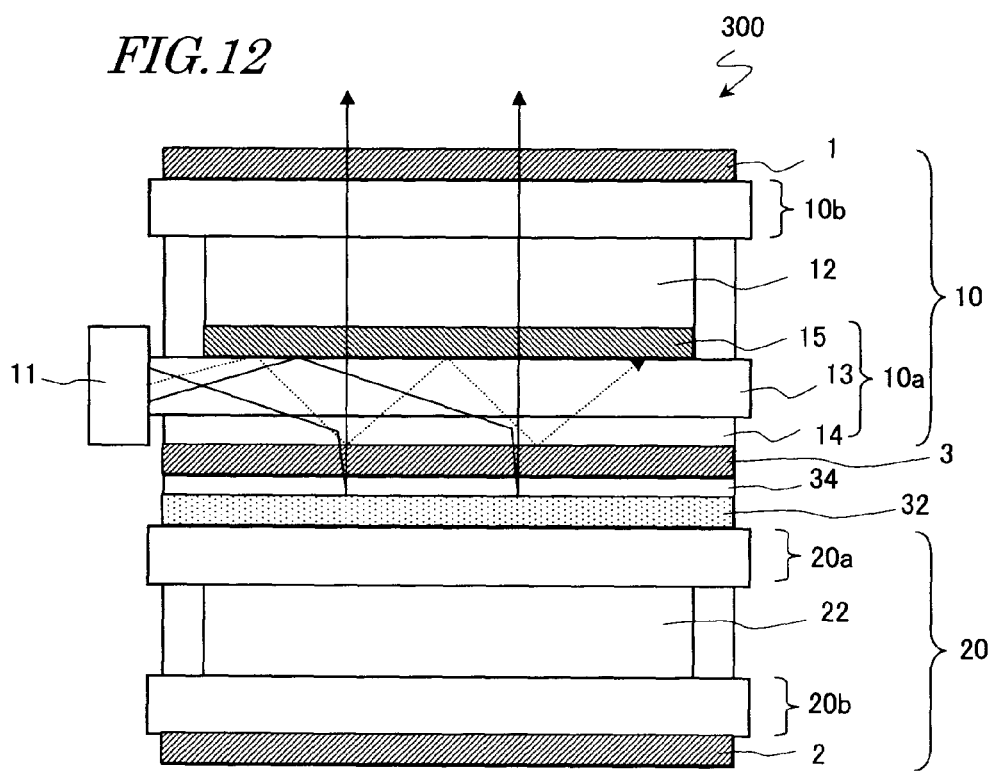
FIG. 12 schematically shows how the first liquid crystal display panel of the liquid crystal display device 300 performs display.

When the first panel 10 is to perform display, as shown in FIG. 12, the first dimmer 32 is in the light reflective state. Namely, the first panel 10 performs display using light which has been output from the rear substrate 10a of the first panel 10, passed through the polarizing plate 3, and then reflected by the dimmer 32 in the light reflective state.

When the second panel 20 is to perform display, as shown in FIG. 13, the dimmer 32 is in the light transmissive state. Namely, the second panel 20 performs display using light which has been output from the rear substrate 10a of the first panel 10 and passed through the polarizing plate 3 and the dimmer 32 in the light transmissive state.

In the liquid crystal display device 300 in this preferred embodiment also, as compared with the case where the backlight is used as shown in FIG. 16, the entire thickness of the liquid crystal display device can be reduced by the thickness of the light guide plate, which is provided in the case of FIG. 16 but not in this embodiment. In addition, one polarizing plate 3 is shared by the two liquid crystal display panels, which can further reduce the thickness of the liquid crystal display device.

Furthermore, in this preferred embodiment, the light source does not need to be provided to the side of the rear substrate 20a of the second panel 20, which can reduce the production cost. The rear substrate 20a of the second panel 20 does not need to include a light guide layer or a low refractive index layer, which can further reduce the production cost.

FIGS. 11 through 13 show the first panel 10 and the second panel 20 with substantially the same size (i.e., the display screens are shown with substantially the same size). The second panel 20 may be smaller than (i.e., may have a smaller display screen than that of) the first panel 10 because the rear substrate 20a of the second panel 20 does not need to include a light guide layer. As understood from the above, in this preferred embodiment, the second panel 20 has a higher degree of designing freedom.

The dimmer 32 is switched between the light transmissive state and the light reflective state in synchronization with the driving of the first panel 10 and the second panel 20. This allows the two panels to appear as being lit up at the same time.

Figures 15A, 15B, 15C:
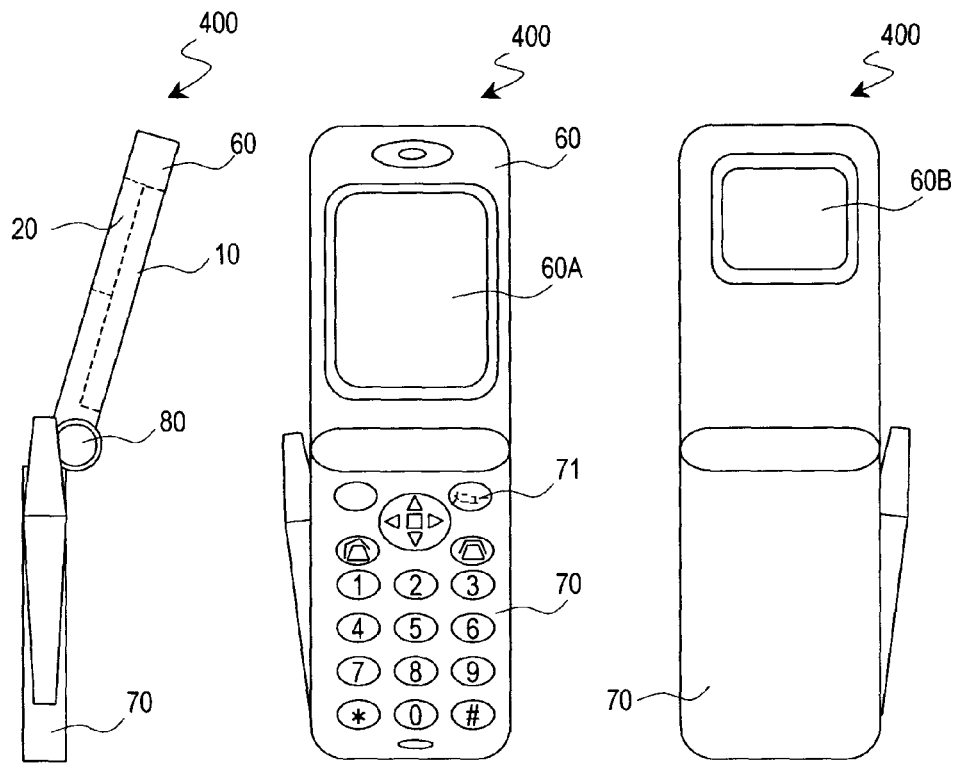

A liquid crystal display device according to preferred embodiments of the present invention can have a reduced thickness and therefore is preferably usable for mobile phones. FIGS. 14A and 14B and FIGS. 15A-15D show a foldable type phone 400 including a liquid crystal display device according to the present invention. FIGS. 14A and 14B show a folded state, wherein FIG. 14A is a side view and FIG. 14B is a front view. FIGS. 15A, 15B and 15C show an opened state, wherein FIG. 15A is a side view, FIG. 15B is a front view, and FIG. 15C is a rear view.

The mobile phone 400 is a so-called two screen type mobile phone including a main display screen 60A for displaying main information and a sub display screen 60B for displaying supplementary information. The sub display screen 60B displays, for example, the radio wave receiving state, the remaining battery life or the like.

The mobile phone 400 includes a liquid crystal display device according to any of the various preferred embodiments of the present invention (in the figures, the elements other than the first panel 10 and the second panel 20 are omitted) and a housing for accommodating various elements including the liquid crystal display device.

The housing includes a display section 60 for accommodating the liquid crystal display device, an operation section 70 including operation keys 71, and a connection section (e.g., a hinge) 80 for connecting the display section 60 and the operation section 70. The housing is foldable at the connection section 80. The mobile phone 400 includes a liquid crystal display device according to any of the various preferred embodiments of the present invention in the display section 60, and therefore can have a reduced thickness than the conventional mobile phones.

A liquid crystal display device according to preferred embodiments of the present invention can have a reduced thickness than the conventional mobile phones, and is preferably usable for various types of mobile electronic devices, especially preferably for foldable type mobile phones.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device, comprising:
   a first liquid crystal display panel and a second liquid crystal display panel located back to back, wherein:
   the first liquid crystal display panel includes a first substrate, a second substrate located opposite from the second liquid crystal display panel with respect to the first substrate, a first liquid crystal layer provided between the first substrate and the second substrate, and a first polarizing element located opposite from the first substrate with respect to the first liquid crystal layer; and
   the second liquid crystal display panel includes a third substrate, a fourth substrate located opposite from the first liquid crystal display panel with respect to the third substrate, a second liquid crystal layer provided between the third substrate and the fourth substrate, and a second polarizing element located opposite from the third substrate with respect to the second liquid crystal layer;
   the liquid crystal display device further comprising:
   a first light source, provided to a side of the first substrate of the first liquid crystal display panel, and arranged to emit light toward a side surface of the first substrate;
   a second light source, provided to a side of the third substrate of the second liquid crystal display panel, and arranged to emit light toward a side surface of the third substrate; and
   a third polarizing element provided between the first liquid crystal display panel and the second liquid crystal display panel; wherein
   the first substrate includes a first light guide layer arranged to direct light, which is incident on the first substrate from the first light source and propagating inside the first substrate, toward the second liquid crystal display panel; and
   the third substrate includes a second light guide layer arranged to direct light, which is incident on the third substrate from the second light source and propagating inside the third substrate, toward the first liquid crystal display panel.

2. The liquid crystal display device of claim 1, wherein the first liquid crystal display panel is arranged to perform display using light which has been output from the third substrate of the second liquid crystal display panel and passed through the third polarizing element, and the second liquid crystal display panel is arranged to perform display using light which has been output from the first substrate of the first liquid crystal display panel and passed through the third polarizing element.

3. The liquid crystal display device of claim 1, further comprising:
   a first dimmer provided between the first substrate and the third polarizing element, the first dimmer being switchable between a light reflective state and a light transmissive state; and
   a second dimmer provided between the third substrate and the third polarizing element, the second dimmer being switchable between the light reflective state and the light transmissive state.

4. The liquid crystal display device of claim 3, wherein the first liquid crystal display panel is arranged to perform display using light which has been output from the first substrate, passed through the first dimmer in the light transmissive state and the third polarizing element, and then reflected by the second dimmer in the light reflective state; and the second liquid crystal display panel is arranged to perform display using light which has been output from the third substrate, passed through the second dimmer in the light transmissive state and the third polarizing element, and then reflected by the first dimmer in the light reflective state.

5. The liquid crystal display device of claim 3, wherein the first dimmer and the second dimmer each includes an electrochromic element, the light reflectance of which is changed in accordance with a voltage application.

6. The liquid crystal display device of claim 1, wherein the first substrate includes a first transparent plate arranged to support the first light guide layer, and a first low refractive index layer provided between the first transparent plate and the first liquid crystal layer and having a lower refractive index than that of the first transparent plate; and the third substrate includes a second transparent plate arranged to support the second light guide layer, and a second low refractive index layer provided between the second transparent plate and the second liquid crystal layer and having a lower refractive index than that of the second transparent plate.

7. The liquid crystal display device of claim 1, wherein the first light guide layer includes a plurality of first reflective films arranged to reflect the light, which is propagating inside the first substrate, toward the second liquid crystal display panel, and the second light guide layer includes a plurality of second reflective films arranged to reflect the light, which is propagating inside the third substrate, toward the first liquid crystal display panel.

8. The liquid crystal display device of claim 7, wherein the plurality of first reflective films and the plurality of second reflective films are a plurality of dielectric films.

9. A mobile electronic device comprising the liquid crystal display device of claim 1.

10. The mobile electronic device of claim 9, wherein the mobile electronic device is a foldable mobile phone.

* * * * *